(12) United States Patent
Lee

(10) Patent No.: US 6,540,241 B2
(45) Date of Patent: Apr. 1, 2003

(54) HANDCART

(76) Inventor: Wen-Ching Lee, No. 46-11, Pi-Tao, Pi-Tao Li, Tan-Shui Chen, Taipei Hsien (TW)

( * ) Notice: Subject to any disclaimer, the term of this patent is extended or adjusted under 35 U.S.C. 154(b) by 0 days.

(21) Appl. No.: 09/884,329

(22) Filed: Jun. 19, 2001

(65) Prior Publication Data

US 2002/0190489 A1 Dec. 19, 2002

(51) Int. Cl.[7] .................................................. B60P 1/02
(52) U.S. Cl. ..................... 280/43.12; 414/495; 254/2 C
(58) Field of Search .......................... 280/43.12, 43.11, 280/43, 43.17; 414/495; 254/2 R, 2 C

(56) References Cited

U.S. PATENT DOCUMENTS

| | | | | |
|---|---|---|---|---|
| 3,567,240 A | * | 3/1971 | Brassington | 280/43.12 |
| 3,576,333 A | * | 4/1971 | Danielson | 280/43.12 |
| 3,814,456 A | * | 6/1974 | Bryntse | 280/43.12 |
| 3,817,546 A | * | 6/1974 | Sugiura | 280/43.12 |
| 3,982,767 A | * | 9/1976 | Larsson et al. | 280/43.12 |
| 4,424,885 A | * | 1/1984 | Kedem | 280/43.12 |
| 4,589,669 A | * | 5/1986 | Kedem | 280/43.12 |
| 4,669,561 A | * | 6/1987 | Sheen | 280/43.12 |
| 4,938,493 A | * | 7/1990 | Okuda | 280/43.12 |
| 4,969,794 A | * | 11/1990 | Larsen | 280/43.12 |
| 5,403,024 A | * | 4/1995 | Frketic | 280/43.12 |
| 5,951,234 A | * | 9/1999 | Johansson | 280/43.12 |

* cited by examiner

*Primary Examiner*—Brian L. Johnson
*Assistant Examiner*—Jeffrey J. Restifo
(74) *Attorney, Agent, or Firm*—Thorp Reed & Armstrong LLP

(57) ABSTRACT

A handcart is composed of a body, a lifter and a coupler. The body has two parallel rails connected together by a crosspiece integrated at rear ends of the support boards, two front wheels respectively provided beneath front ends of the rails, and two elongated bars respectively provided beneath the rear ends of the rails. The lifter is provided at the rear end of the body. The lifter has a hydraulic bar and a handle side by side and uprightly provided at a top thereof, and a rear wheel provided thereunder. The coupler connecting the body and the lifter together is detachably and pivotally mounted between the body and the lifter. Whereby, when the coupler is damaged, it is very easy for a user to replace the coupler with a new one.

4 Claims, 4 Drawing Sheets

HANDCART

BACKGROUND OF THE INVENTION

1. Field of the Invention

The present invention is related to a handcart, and more particularly to a handcart of which a coupler is detachably mounted thereon for ease of replacement when necessary.

2. Description of Related Art

Referring to FIG. 4, a conventional handcart has a body (70) with two parallel support rails (706). The support rails (706) are connected together by two arms (701) respectively formed thereon. Two elongated bars (705) are respectively provided under the rear ends of the support rails (706). A coupler (90) is welded on a rear end of the body (70) and has a connecting bar (91) with two links (92) formed respectively at two ends of the connecting bar (91). Both ends of the connecting bar (91) are respectively welded with the arms (701). Front ends of the links (92) are respectively engaged with the elongated bars (705) and rear ends of the links (92) are pivotally mounted on a lifter (80). The lifter (80) has a handle (801) for being operated by a user.

In use, the user put the support rails (706) under a bottom of a bale and operates the handle (801) to lift up the support rails (706). Then, the bale is mounted on the support rails (706) and free from the ground whereby the handcart can be pulled to move.

However, it is often found that the connecting bar (91) becomes deformed when the handcart is overloaded. Because the connecting bar (91) is integrated with the arms (701) by welding, when the handcart is repaired and the connecting bar (91) is replaced, the arms (701) also have to be replaced. Therefore, the cost of repairing the handcart is almost equal to the price of a new one. The cost is so uneconomic that few such defective handcarts are repaired and most of them are abandoned thereby leading to considerable waste.

Therefore, the invention provides a handcart to mitigate and/or obviate the aforementioned problems.

SUMMARY OF THE INVENTION

The main objective of the invention is to provide a handcart of which a coupler is detachably mounted between a body and a lifter.

Other objects, advantages and novel features of the invention will become more apparent from the following detailed description when taken in conjunction with the accompanying drawings.

DETAILED DESCRIPTION OF THE PREFERRED EMBODIMENT

Figure 1:
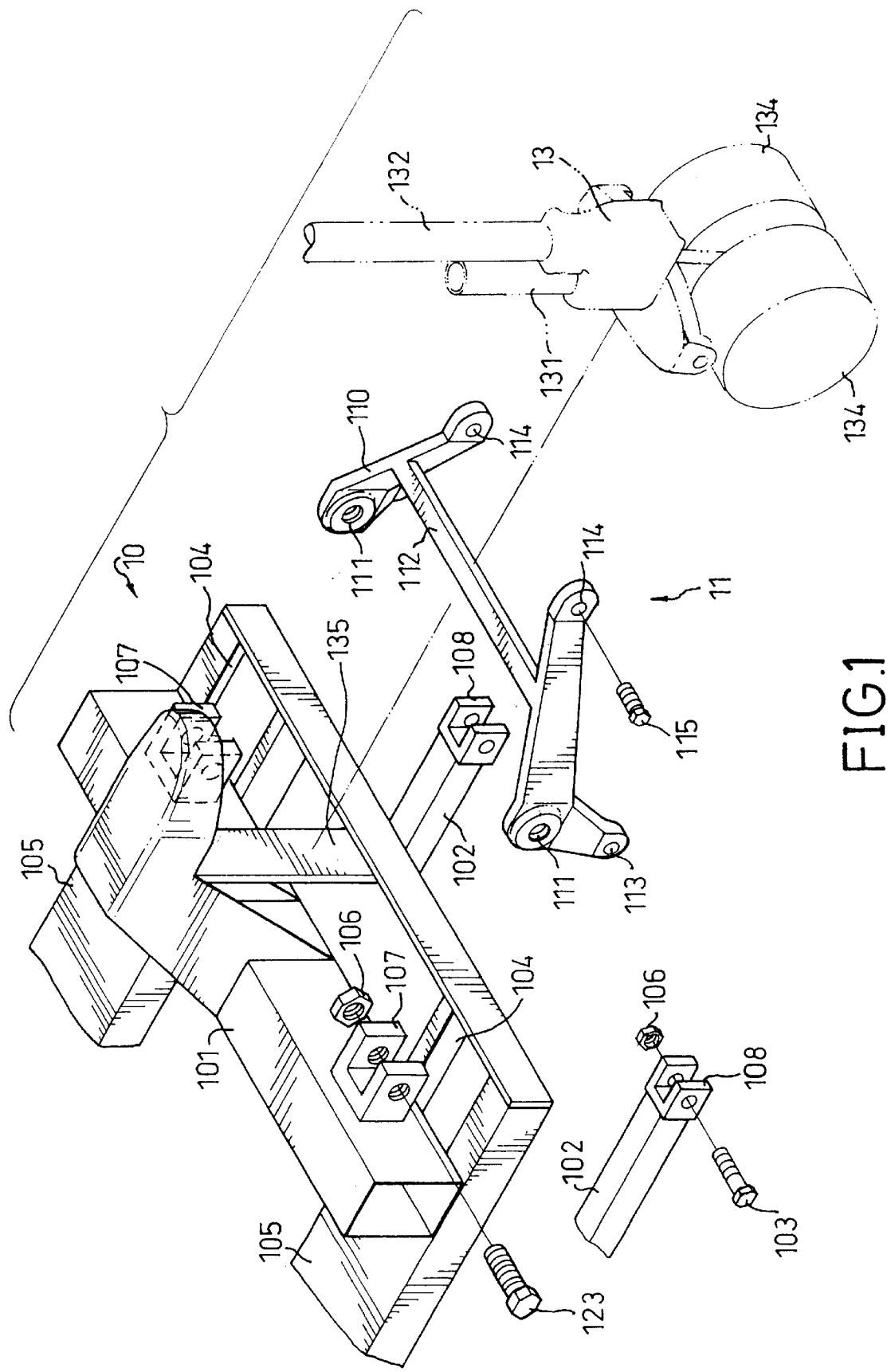
FIG. 1 is an exploded perspective view of a handcart in accordance with the invention.
Figure 2:
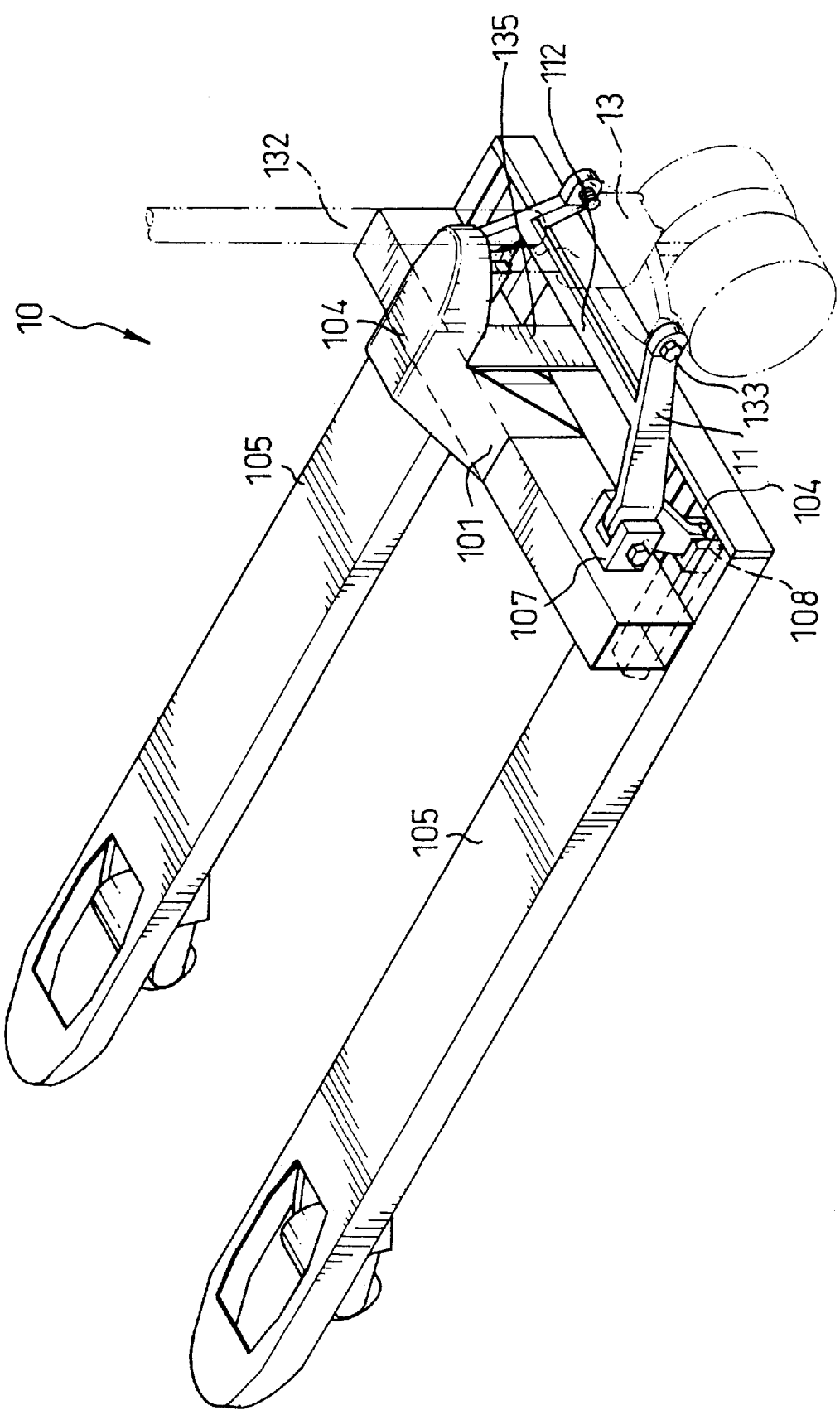
FIG. 2 is a perspective view of the handcart in accordance with the invention in assembly.
Figure 3:
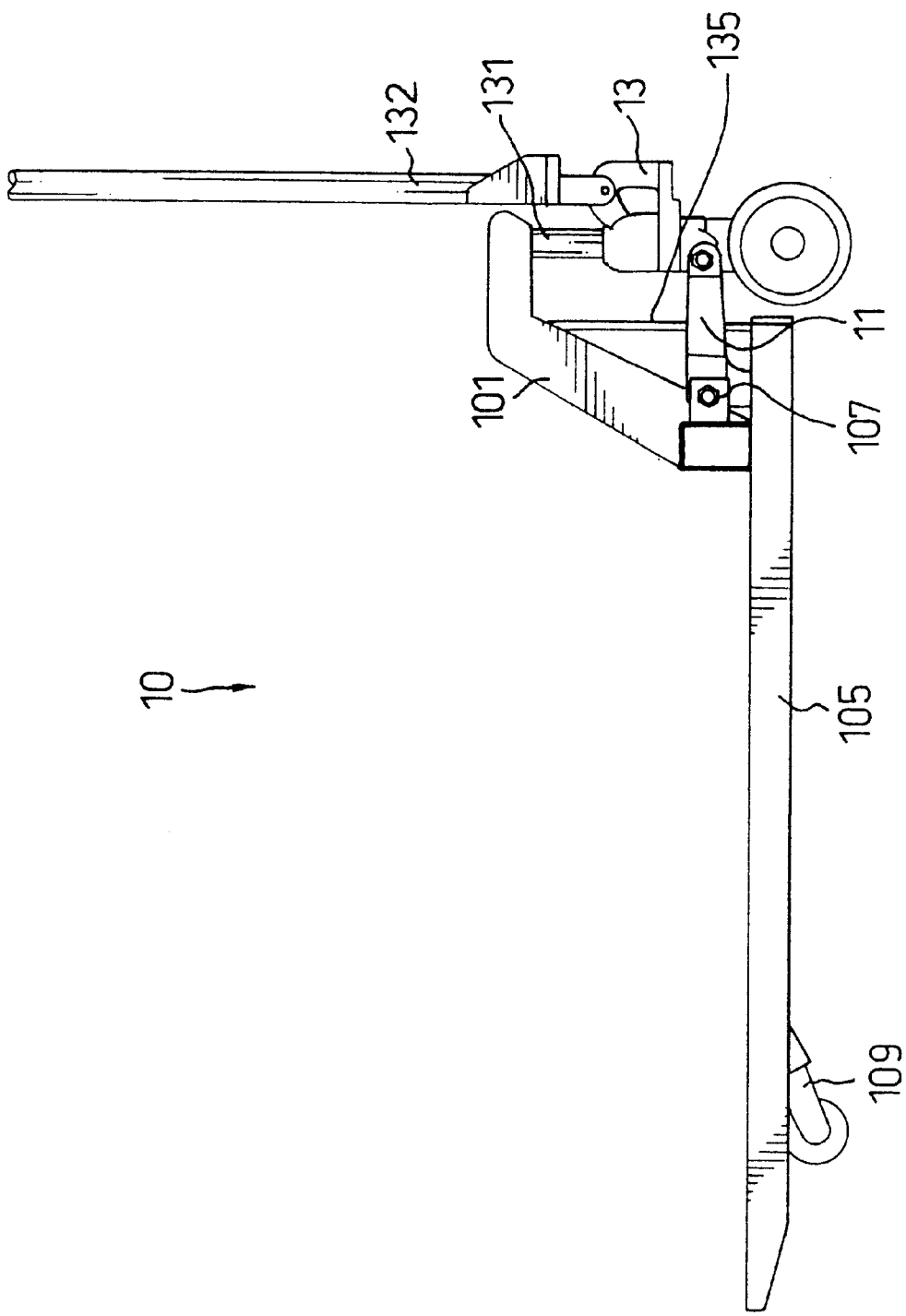
FIG. 3 is a side view of the handcart shown in FIG. 2.
Figure 4:
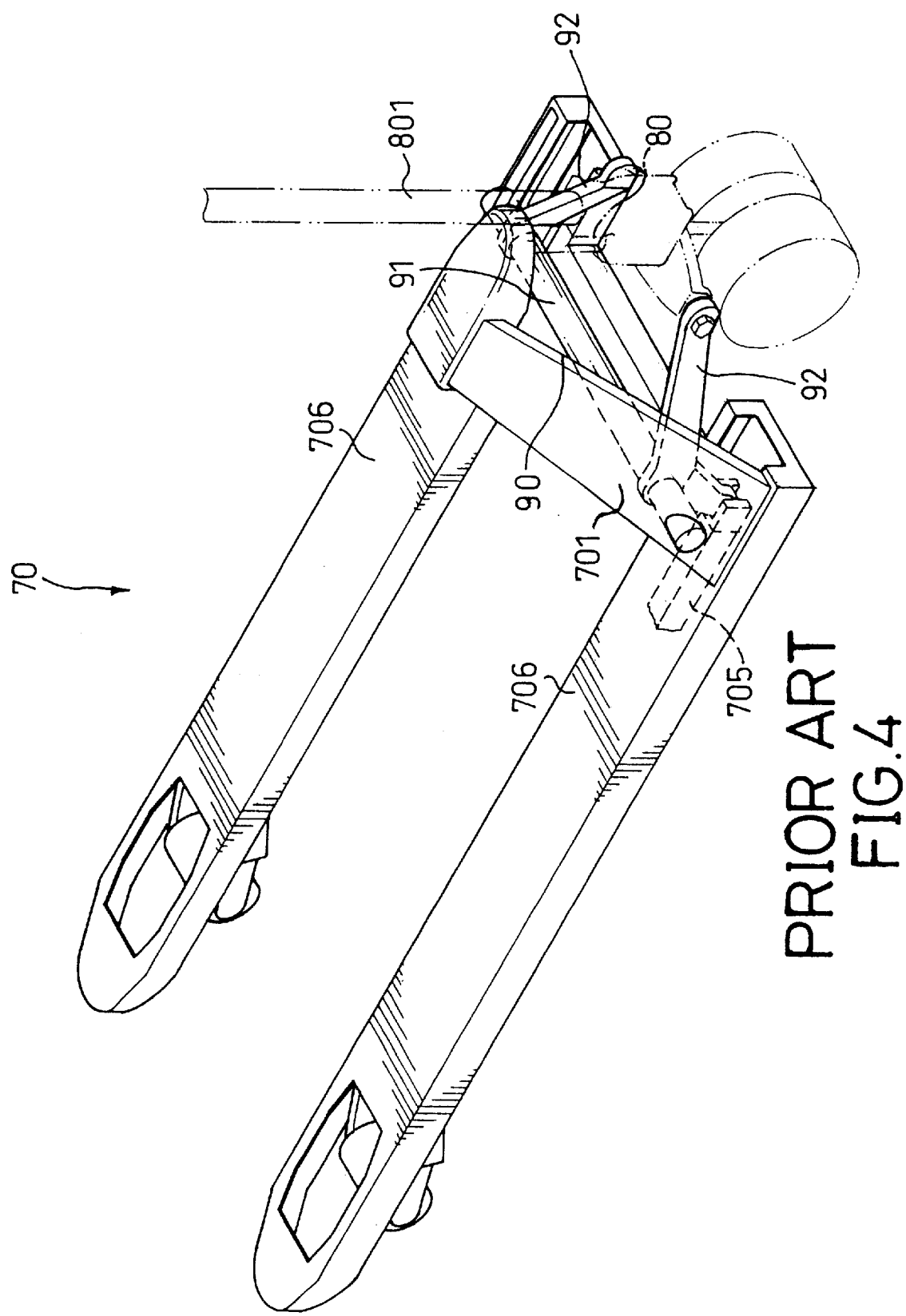
FIG. 4 is a perspective view of a conventional handcart.

Referring to FIGS. 1–3, a handcart in accordance with the invention is essentially composed of a body (10), a coupler (11) and a lifter (13).

The body (10) has two parallel support rails (105) connected together by a crosspiece (101) at rear ends of the support rails (105). The crosspiece (101) is integrated with and perpendicular to the support rails (105). A vertical support (135) is formed at a middle portion of the crosspiece (101) to reinforce the strength of the body (10). Two first pivot joints (107) are formed on a rear face of the crosspiece (101) and at two sides of the vertical support (135) respectively. The support rails (105) each have an opening (104) defined at the rear ends thereof. Two elongated bars (102) are respectively received in the openings (104) and each have a second pivot joint (108) formed at a rear end thereof. The body (10) further has two front wheels (109) respectively provided beneath the rails (105) and connected with the elongated bars (102), as shown in FIG. 3.

The coupler (11) has two L-shaped links (110) each formed with a long arm and a short arm (neither numbered). A connecting bar (112) is formed between the long arms to connect the L-shaped links (110) together. Each of the L-shaped links (110) has a first aperture (111) defined at a corner thereof, a second aperture (113) defined at a free end of the short arm, and a third aperture (114) defined at a free end of the long arm.

The lifter (13) has a handle (132) and a hydraulic bar (131) side by side and uprightly formed at a top thereof. Two thread holes (133) are respectively defined at two side walls of the lifter (13). A pair of rear wheels (134) is provided under the lifter (13).

In assembly, the corners of the L-shaped links (110) are respectively and pivotally mounted in the first joints (107) by a first bolt (123) inserted through the first aperture (111) and engaged with a nut (106). The free ends of the short arms are respectively and pivotally mounted in the second joints (108) by a second bolt (103) inserted though the second aperture (113) and engaged with the nut (106). The free ends of the long arms (110) are respectively and pivotally mounted with the lifter (13) by a screw (115) inserted through the third aperture (114) and engaged in the thread hole (133).

For carrying loads, a user first inserts the rails (105) under the bottom of a load such as a pallet, and operates the lifter (13) to pivot the front wheels (109) via the elongated bars (102) to lift the rails (105). Then, the pallet is mounted on the rails (105) and free from the ground whereby the handcart can be pulled to move.

From the above description, it is noted that the invention has the following advantages:

1. By the reinforcement from the vertical support (135), the load capability of the handcart is upgraded I comparison to the conventional cart.
2. Because most of burden is borne by the crosspiece (101) and the vertical support (135), the load on the coupler (11) is significantly lower than that on the crosspiece (101) and the vertical support (135) so that the coupler (11) has a little chance of being damaged.
3. When the coupler (11) is damaged, it is very convenient for a user to replace the coupler (11) which is detachably mounted on handcart, thereby effecting a cost-saving and reducing scrap material.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A handcart comprising:

a body (10), the body (10) having two parallel rails (105) connected together by a crosspiece (101) integrated at rear ends of the rails (105), the crosspiece (101) having two first pivot joints (107) formed at a rear face thereof, two front wheels (109) respectively provided beneath front ends of the rails (105), and two elongated bars (102) respectively provided beneath the rear ends of the rails (105);

a lifter (13) provided at the rear end of the body, the lifter (13) having a hydraulic bar (131) and a handle (132) side by side and uprightly provided at a top thereof, and at least one rear wheel (134) provided thereunder; and a coupler (11) including two L-shaped links (110) each with a long arm and a short arm, a first aperture (111) defined at a corner thereof and joined with a respective one of the first joints (107) by a first bolt (123) inserted through the first aperture (111) and engaged with a nut (106), and a connecting bar (112) extending between the L-shaped links (110), the coupler (11) connecting the body (10) and the lifter (13) together detachably and pivotally mounted between the body (10) and the lifter (13).

2. The handcart as claimed in claim 1, wherein the links (110) each have a second aperture (113) defined at a free end of the short arm; the bars (102) each have a second joint (108) formed at a rear end thereof; and the free ends of the short arms are pivotally mounted with the second joints (108) respectively by a second bolt (103) inserted through the second aperture (113) and engaged with the nut (106).

3. The handcart as claimed in claim 2, wherein the links (110) each have a third aperture (114) defined at a free end of the long arm; the lifter (13) has two thread holes (133) respectively defined at two sides thereof; and the free ends of the long arms are pivotally mounted with the lifter (13) by a screw (115) inserted through the third aperture (114) and engaged in the thread hole (133).

4. The handcart as claimed in claim 1, wherein the body (10) has a vertical support (135) formed at a middle of the crosspiece (101) to reinforce the strength thereof.

* * * * *